United States Patent [19]

Markarian et al.

[11] 4,155,154
[45] May 22, 1979

[54] ANODIZATION OF ELECTROLYTIC CAPACITOR SECTIONS

[75] Inventors: Mark Markarian; Francis J. Gamari; Franz S. Dunkl, all of Williamstown, Mass.

[73] Assignee: Sprague Electric Company, North Adams, Mass.

[21] Appl. No.: 839,870

[22] Filed: Oct. 6, 1977

[51] Int. Cl.² ............................................. B01J 17/00
[52] U.S. Cl. .................................. 29/570; 204/56 R; 204/58
[58] Field of Search .................. 29/570; 204/58, 56 R

[56] References Cited

U.S. PATENT DOCUMENTS

| | | | |
|---|---|---|---|
| 1,773,665 | 8/1930 | Edelman | 204/58 |
| 1,963,049 | 6/1934 | Georgiev | 29/570 |
| 2,073,060 | 3/1937 | Harding | 204/58 |
| 2,122,392 | 6/1938 | Robinson | 29/570 |

Primary Examiner—W. Tupman
Attorney, Agent, or Firm—Connolly and Hutz

[57] ABSTRACT

Wound foil electrolytic capacitor sections are anodized after winding. After removal of the formation electrolyte, the sections are rinsed, dried, and impregnated with working electrolyte. The sections are assembled by usual means into capacitors.

13 Claims, 1 Drawing Figure

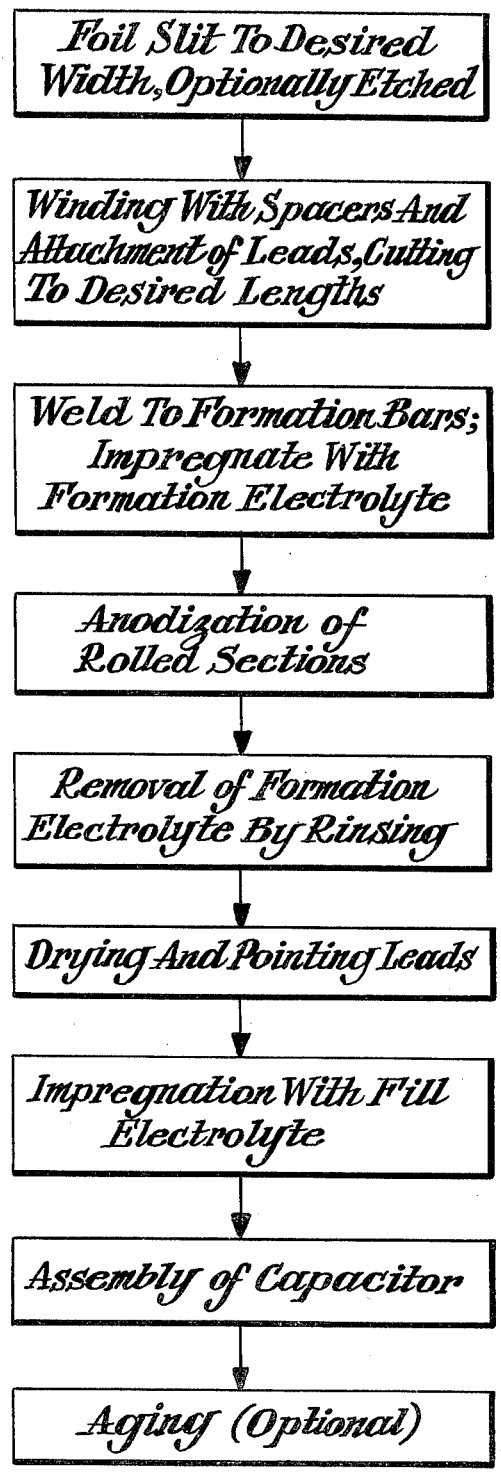

ANODIZATION OF ELECTROLYTIC CAPACITOR SECTIONS

BACKGROUND OF THE INVENTION

This invention relates to wound foil electrolytic capacitor sections. More specifically, it relates to tantalum and tantalum-aluminum wound foil sections which are anodized after winding.

Electrolytic capacitors employ metal electrodes on which a thin dielectric oxide of the electrode metal has been formed. Tantalum foil provides many advantages as electrode material including being compatible with electrolytes over a temperature range of about −55° C. to 125° C. with minimum change in resistance and capacitance. It also provides a high capacitance per unit volume. It is more expensive than aluminum foil, however, and one way of reducing capacitor cost has been to use an aluminum foil cathode with a tantalum foil anode as described by Markarian et al. in U.S. Pat. No. 3,654,523 issued Apr. 4, 1972.

Commonly, precut foil strips (which may be etched) are attached to formation bars and inserted into anodization baths to be anodized to the desired voltage and then rinsed and dried. The anodized foil strips with the thin dielectric oxide layer thereon are then convolutely wound with cathode foil and interleaved spacer strips into a tight roll. After impregnation with electrolyte and assembly into the final capacitor, the units must be aged to repair damage to the dielectric oxide film caused by handling, rolling, etc.

SUMMARY OF THE INVENTION

It is an object of this invention to provide a process for manufacturing rolled tantalum foil electrolytic capacitor sections in which damage to the dielectric oxide on the foil is reduced or eliminated.

It is another object of this invention to provide a process for manufacturing tantalum foil electrolytic capacitor sections in which the sections may be rolled automatically from rolls of raw foil instead of precut anodized strips.

It is still another object of this invention to provide a process for manufacturing tantalum foil electrolytic capacitor sections in which the lead wires may be advantageously welded in the middle of the electrode lengths without the danger of the electrode strips banging or tangling during anodization.

It is a further object of this invention to provide a process for manufacturing tantalum foil electrolytic capacitor sections by which capacitance may be controlled to close tolerances.

It is still another object of this invention to provide a process for manufacturing tantalum foil electrolytic capacitor sections which may not require aging to reach desired low direct current leakage value.

These and other objects are attained by rolling tantalum foil or tantalum and aluminum foils, which may have been etched, into capacitor sections with interleaved spacers. The sections are fastened to formation bars and anodized. The anodized sections are rinsed free of formation electrolyte, dried, and impregnated with working electrolyte. The sections are then assembled into capacitors in the usual way.

BRIEF DESCRIPTION OF THE DRAWING

A schematic flow diagram is presented for the process of the present invention. Raw or etched tantalum foil or etched tantalum and aluminum foils which have been slit to the desired width are fed to a winding machine to be convolutely wound into rolled sections with interleaved spacers. The leads are preferably attached by welding, and the foils are preferably automatically cut to the desired length during the rolling operation and then fastened, e.g., by tape, so the sections will not unroll.

Next, the rolled sections are welded to standard formation bars and impregnated with formation electrolyte, preferably under vacuum. The impregnated sections are then placed in the anodization tanks containing formation electrolyte and usually a tantalum counterelectrode which serves as a common cathode. Optionally, the individual cathodes may be connected to the anodization circuit, and no counterelectrode is used in this case. If it is desired to anodize the cathode to a low voltage, e.g., 4 V, the cathodes of the rolled sections are connected to the positive electrode and anodized. Then they are disconnected, and the anodes of the units are connected to the positive electrode (if the counterelectrode is not used, the cathodes are connected to the negative electrode).

When anodization is complete, the rolled sections attached to the formation bars are removed from the anodization tank and put into a rinse tank containing deionized water for sufficient time to remove the formation electrolyte.

The units are dried, preferably at 110° C., and removed from the formation bars. The risers are pointed, and the units are impregnated with fill or working electrolyte and assembled into capacitors by usual means. The assembled capacitors may be subjected to an aging step, if desired.

DESCRIPTION OF THE PREFERRED EMBODIMENTS

Raw tantalum foil, or tantalum and aluminum foils, which may have been etched, are wound with interleaving spacers into capacitor sections. The foil may be cut to the desired lengths during the rolling of the sections. The wire terminations may be prewelded to the foil or the welding may be done on the rolling machine. The tantalum lead wire also can be welded in the middle of the required anode length rather than at the end. By making connection in the middle of the foil, foil resistance in reduced to one-quarter of that of the same anode length with the lead at the end. Following rolling and securing of the sections, e.g., by taping, the sections are attached by the terminations to formation bars. As described in the examples below, the cathode may or may not be formed to a low voltage first, e.g., to 4 V, and may or may not be connected during the anodization of the anode foil. When the tantalum anode foil is anodized to the desired level, the sections are removed from the anodization electrolyte, thoroughly rinsed of anodization electrolyte, dried and removed from the formation bars. The leads are pointed, and the sections are impregnated with the working electrolyte which is different from the formation electrolyte.

One preferred working electrolyte is tris (triethylammonium)-trimethyl tetraphosphate in dimethylformamide, the preparation of which is given by Schwarz and Ross in U.S. Pat. No. 2,934,682 issued Apr. 26, 1960. Another preferred working electrolyte consists of 10 wt.% ammonium nitrate in dimethylformamide.

The preferred formation electrolytes are aqueous 0.1 wt.% phosphoric acid and aqueous 80% wt.% glycol- 0.2 wt.% phosphoric acid for the tantalum-tantalum combination. For the tantalum-aluminum combination, the preferred formation electrolyte is 0.5 wt.% phosphoric acid in an acetic acid-triethylamine azeotrope. For this combination, the preferred working electrolyte is 0.1 M diisopropylammonium borodi-2,3-naphthalenediolate in dimethylformamide.

It is considered to be undesirable to use the same electrolyte for anodization and for fill, as water is generally used as the oxygen donor required during anodization to form a good oxide film but is unsuitable over tantalum capacitor operating temperature range of 3155° C. and +125° C. because of its boiling and freezing points. For this reason, the industry generally uses aqueous formation electrolytes and non-aqueous fill or working electrolytes in tantalum capacitors.

The following examples show in more detail the formation of capacitors by the process of this invention.

EXAMPLE 1

Etched tantalum anode foil (10-in×⅜-in×0.001-in) was wound with etched aluminum cathode foil (10½-in×⅜-in ×0.001-in) with 0.001-in thick interleaved paper spacers. The formation electrolyte was an azeotrope of 138 g glacial acetic acid, 62 g triethylamine, and 2 ml water and contained 2 g concentrated phosphoric acid. It has a resistivity of 207 ohm-cm at 25° C. and a pH of 5.2. The section was impregnated with this electrolyte in vacuum. The anode and cathode were connected to the anodization circuit, and the anode was formed with 10 mA to 35 V. It was rinsed for 29 hr in water at room temperature and then dried for 1 hr at 85° C. It was impregnated with 0.1 M diisopropylammonium borodi-2,3-naphthalenediolate in dimethylformamide and assembled into a capacitor. The capacitance was 155.3 μF, RxC 186, forward leakage current at 25 V, 11 μA after 5 min, and reverse leakage current at 3.4 V, 20 μA after 5 min.

EXAMPLE 2

Etched tantalum and etched aluminum foil were wound with interleaved spacers as in Example 1. The electrolyte of Example 1 was used except that 12 ml of water were present. The anode and cathode were connected, and the unit was formed to 67 V with 20 mA. It was rinsed for 16 hrs in water at room temperature and dried for 1 hr at 105° C. The section was impregnated with the working electrolyte of Example 1 and assembled. The cathode was formed to 4 V. Alternately, the cathode may be formed first during anodization. The unit had a capacitance of 51.3 μF, RxC of 140, forward leakage current at 50 V of 10 μA after 5 min, and reverse leakage current at 3 V of 5 μA after 5 min.

EXAMPLE 3

Unetched tantalum anode foil (10-in×⅜-in×0.0004-in) and unetched tantalum cathode foil (10¼-in×⅜-in×0.0004-in) were wound into capacitor sections with two layers of Benares paper (0.0005-in) interleaved. The sections were welded to standard formation bars and impregnated with 0.1% aqueous phosphoric acid under 45 mm vacuum for 10 min. The cathodes were formed to 4 V at 90° C., 3.5 mA/unit, for 30 min using a common tantalum cathode, and then the anodes were formed to 200 V at 90° C., 20 mA/unit, for 85 min using the common cathode. The sections were rinsed in deionized water for 16 hr, dried for 1 hr at 110° C. and removed from the formation bars after which the risers were pointed. The sections were impregnated with working electrolyte, tris (triethylammonium)-trimethyl tetraphosphate in dimethylformamide. The sections were assembled into capacitors. The temperature characteristics (average of 14 units) rated at 4.6 μF and 150 V, and aged 16 hr at 85° C. are as follows:

Table I

| Temperature | Cap(μF) | RxC | Leakage(μA) | % Cap. change |
|---|---|---|---|---|
| 25° C. | 4.372 | 38 | 0.9 at 150V | — |
| 85° C. | 4.488 | 34 | 1.7 at 150V | 2.6 |
| 125° C. | 4.589 | 62 | 1.3 at 100V | 4.9 |
| −55° C. | 3.967 | 384 | — | 9.2 |

Table II

Life test results at 150V and 85° C. are as follows:

| Time | Cap(μF) | RxC | Leakage(μA) |
|---|---|---|---|
| 0 hrs | 4.271 | 2.25 | 0.080 |
| 500 hrs | 4.271 | 2.70 | 0.072 |
| 1000 hrs | 4.337 | 3.02 | 0.057 |
| 2000 hrs | 4.356 | 2.94 | 0.038 |

EXAMPLE 4

Etched tantalum anode foil (8⅜-in×⅜-in×0.001-in) and etched tantalum cathode foil (8⅜-in×⅜-in×0.0005-in) were wound with two layers of 0.0005-in Benares paper interleaved. The risers (welded to the foil before winding) were welded to standard formation bars. The sections were impregnated at room temperature, 45 mm vacuum, for 10 min with 0.1% aqueous phosphoric acid. The cathodes were formed first to 4 V at 90° C., 4 mA/unit, for 50 min and then the anodes were formed to 67 V at 90° C., 35 mA/unit, for 150 min, using a common tantalum cathode for both formations. The sections were rinsed in deionized water for 16 hrs, dried for 1 hr at 110° C., and removed from the formation bars. After pointing the risers, the sections were impregnated with 10 wt.% ammonium nitrate in dimethylformamide and assembled into capacitors. Life test data for the average of 14 units at 85° C. and 50 V are as follows:

Table III

| Time | Cap(μF) | RxC | Leakage(μA) |
|---|---|---|---|
| 0 hrs | 70.53 | 73 | 0.41 |
| 500 hrs | 70.84 | 69 | 0.38 |
| 1000 hrs | 70.77 | 69 | 0.31 |
| 2000 hrs | 70.23 | 77 | 0.27 |

EXAMPLE 5

Comparative data is presented for units prepared according to Examples 3 and 4 and standard production units. Data from 13 of the 150 V and 14 of the 50 V experimental units and 10 of each standard (or control) units are averaged. Average deviations for capacitance values are included also.

Table IV

|  | 150V | | 50V | |
|---|---|---|---|---|
| 25° C. | Exptl | Control | Exptl | Control |
| DC Leakage, μA | 0.17 | 0.70 | 0.40 | 0.68 |
| Dissipation Factor | 2.67 | 2.52 | 5.57 | 9.84 |
| Capacitance, μF | 4.276 | 4.01 | 68.99 | 56.22 |
| Average Deviation | 0.020 | 0.197 | 1.24 | 2.17 |
| −55° C. | | | | |
| Impedance, Ω | 370 | 382 | 24 | 60 |
| Capacitance, μF | 3.81 | 3.33 | 58.6 | 41.8 |
| Average Deviation | 0.086 | 0.24 | 1.56 | 3.90 |
| 25° C. | | | | |

Table IV-continued

|  | 150V |  | 50V |  |
|---|---|---|---|---|
| DC Leakage, μA | 0.17 | 0.67 | 0.16 | 0.31 |
| Dissipation Factor | 2.8 | 2.9 | 8.4 | 12.9 |
| Capacitance, μF | 4.29 | 4.03 | 70.4 | 57.8 |
| Average Deviation | 0.018 | 0.231 | 1.2 | 2.2 |
| 85° C. |  |  |  |  |
| DC Leakage, μA | 2.1 | 3.6 | 1.7 | 6.5 |
| Dissipation Factor | 2.4 | 2.1 | 8.2 | 10.4 |
| Capacitance, μF | 4.45 | 4.15 | 77.5 | 64.0 |
| Average Deviation | 0.018 | 0.214 | 1.0 | 2.2 |
| 125° C. |  |  |  |  |
| DC Leakage, μA | 1.9 | 6.9 | 1.7 | 4.7 |
| Dissipation Factor | 4.0 | 2.0 | 8.5 | 9.9 |
| Capacitance, μF | 4.59 | 4.26 | 81.8 | 67.3 |
| Average Deviation | 0.032 | 0.212 | 0.98 | 2.3 |
| 25° C. |  |  |  |  |
| DC Leakage, μA | 0.13 | 0.51 | 0.30 | 0.62 |
| Dissipation Factor | 2.7 | 2.9 | 6.9 | 12.2 |
| Capacitance, μF | 4.26 | 4.01 | 69.7 | 56.5 |
| Average Deviation | 0.023 | 0.235 | 1.21 | 2.11 |

As can be seen, it is possible to produce capacitors by the process of the present invention within close tolerances. Leakage current also is consistently lower.

EXAMPLE 6

The effect of anodizing rolled units using a common tantalum counterelectrode instead of connecting the cathodes of the units to the anodization circuitry is shown in this example. Data are presented also to show that aging is optional rather than necessary with units thus processed.

Two units were anodized with a common tantalum cathode and two units were anodized with the cathode connected to the anodization circuit. All units were formed to 67 V with 35 mA in 0.1% phosphoric acid with the cathodes being formed first to 4 V. In Table V, units 1 and 2 had their cathodes connected to the circuit during formation, and units 3 and 4 did not, a common cathode being used.

Table V

| Unit # | Time to reach voltage | Leakage decay to 0.7 mA, time | Cap(μF) | RxC |
|---|---|---|---|---|
| 1 | 78 min | 30 min | 52.10 | 156 |
| 2 | 80 min | 30 min | 53.17 | 167 |
| 3 | 72 min | 75 min | 54.58 | 44 |
| 4 | 75 min | 75 min | 58.29 | 35 |

Two more units were formed as above without cathode connection during anodization, rinsed for 6 hrs, dried for 1 hr, at 110° C., and impregnated. Capacitance, RxC, and leakage current after 2 min and 5 min before and after aging are shown below.

Table VI

|  | Cap(μF) | RxC | Leakage(μA) 2 min | Leakage(μA) 5 min |
|---|---|---|---|---|
| Before Aging |  |  |  |  |
| 1 | 51.22 | 56 | 2.4 | 1.2 |
| 2 | 54.59 | 51 | 1.9 | 0.96 |
| After Aging |  |  |  |  |
| 1 | 51.93 | 60 | 1.1 | 0.4 |
| 2 | 55.40 | 52 | 1.0 | 0.4 |

Fourteen units were formed as above, rinsed for 6 hrs, dried at 110° C. for 1 hr and impregnated with 10 wt.% ammonium nitrate in dimethylformamide. Capacitance, RxC, and leakage current before and after aging and capacitance, RxC, and percent capacitance change at −55° C., 85° C., and 125° C. for the average of 14 units are presented below.

Table VII

|  |  | Cap(μF) | RxC | IL(μA) | % Δ Cap |
|---|---|---|---|---|---|
| Pre-Age | (50V) | 73.28 | 104 | 0.85 | — |
| Post-Age | " | 72.49 | 101 | 0.59 | — |
| −55° C. | " | 60.82 | 549 | — | 17.0 |
| +85° C. | " | 78.36 | 85 | 4.4 | 6.9 |
| +125° C. | (30V) | 79.23 | 77 | 2.3 | 8.1 |

EXAMPLE 7

This example presents life test data for units formed to 400 V by the process of the present invention. The formation electrolyte was aqueous 80 wt.% glycol—0.2 wt.% phosphoric acid. Because of the high resistivity of this electrolyte (6750Ω-cm at 90° C. compared to 360Ω-cm at 90° C. for aqueous 1% phosphoric acid), better results were obtained when the cathodes were connected to the anodization circuit with no counterelectrode. Life test data at 300 V, 85° C. (capacitance in μF, dissipation factor in %, and leakage current in μA) are given for an average of 7 units.

Table VIII

| Time | Cap(μF) | Dissipation Factor | Leakage(μA) |
|---|---|---|---|
| 0 hr | 3.367 | 1.67 | 0.62 |
| 336 hr | 3.355 | 1.23 | 0.49 |
| 1000 hr | 3.344 | 1.34 | 0.14 |

As the examples show, the process of the present invention permits closer control during anodization with the result of closer tolerances in the finished capacitor. Part of this is the result of decreasing the amount of handling and mechanical damage to the anodized foil. Other advantages of this process are that compact units instead of long foil strips are anodized which simplifies handling and allows more units to be anodized at the same time.

What is claimed is:

1. A process for producing an electrolytic capacitor suitable for operation over a wide temperature range comprising first winding cathode foil and anode foil with interleaved spacers into a wound capacitor section, then subjecting the wound section to electrolytic anodic formation, removing the formation electrolyte, impregnating the section with a different working electrolyte, and assembling said section into a capacitor.

2. A process according to claim 1 wherein said cathode foil is etched aluminum foil and said anode foil is etched tantalum foil.

3. A process according to claim 2 wherein in said subjecting step said cathode foil is anodized first to a low voltage and then said anode foil is anodized to a higher voltage during said subjecting step.

4. A process according to claim 3 wherein said formation electrolyte is a solution of 0.5 wt.% phosphoric acid in an acetic acid-triethylamine azeotrope.

5. A process according to claim 4 wherein said working electrolyte is 0.1 M diisopropylammonium borodi-2,3-naphthalenediolate in dimethylformamide.

6. A process according to claim 1 wherein said cathode foil and said anode foil are both tantalum foil.

7. A process according to claim 6 wherein said working electrolyte is 10 wt.% ammonium nitrate in dimethylformamide or tris (triethylammonium)-trimethyl tetraphosphate in dimethylformamide.

8. A process according to claim 7 wherein said formation electrolyte is 0.1 wt.% aqueous phosphoric acid, or aqueous 80 wt.% glycol-0.2 wt.% phosphoric acid.

9. A process according to claim 8 wherein said cathode foil and said anode foil are etched foils.

10. A process according to claim 9, wherein in said subjecting step said cathode foil is anodized first to a low voltage and then said anode is anodized to a higher voltage during said subjecting step.

11. A process according to claim 1 wherein said wound section is subject to a rinse step following removal of said anodization electrolyte and prior to impregnation with said working electrolyte.

12. A process according to claim 11 wherein said section is dried following said rinse step prior to impregnation with said working electrolyte.

13. A process according to claim 1 wherein said assembled capacitor may be subjected to an aging step.

* * * * *